United States Patent
Van Der Ven

(10) Patent No.: US 7,020,154 B2
(45) Date of Patent: Mar. 28, 2006

(54) INFORMATION PROCESSING SYSTEM

(75) Inventor: Erik Van Der Ven, Nijmegen (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 960 days.

(21) Appl. No.: 10/023,121

(22) Filed: Dec. 17, 2001

(65) Prior Publication Data

US 2002/0085576 A1 Jul. 4, 2002

(30) Foreign Application Priority Data

Dec. 20, 2000 (EP) .................... 00204652

(51) Int. Cl.
*H04J 4/00* (2006.01)

(52) U.S. Cl. ................... 370/436; 375/360

(58) Field of Classification Search ............ 370/435, 370/436, 503–531; 375/242, 35, 355, 359, 375/360

See application file for complete search history.

(56) References Cited

U.S. PATENT DOCUMENTS 4,928,289 A * 5/1990 Dingeman ............ 375/293
5,341,371 A    8/1994 Simpson ............. 370/85.4
5,912,928 A * 6/1999 Chieco et al. ......... 375/308
6,037,884 A * 3/2000 Thornton ............. 341/53
6,549,595 B1 * 4/2003 Den Besten et al. ..... 375/360

FOREIGN PATENT DOCUMENTS

WO    WO0005848      7/1999
WO      0005848 A1   2/2000

* cited by examiner

Primary Examiner—Dang Ton
Assistant Examiner—Phuc Tran
(74) Attorney, Agent, or Firm—Peter Zawilski

(57) ABSTRACT

An information processing system contains a sender, a receiver and a communication channel coupled between the sender and the receiver. The communication channel transmits a first and second binary logic signal. The sender encodes data values and information distinguishing successive clock phases into a combination of the first and second signal. The receiver receives the data values and the information. The sender uses alternately a first and a second data dependent criterion to select which one of the first and second signal has a logic level change between immediately successive clock phases. As a result so that the first and second signal are alternately mutually opposite and mutually equal. The first criterion selects the level of the first signal dependent on the data value. The second criterion provides for a level change of either the first or the second signal depending on the data value.

6 Claims, 2 Drawing Sheets

INFORMATION PROCESSING SYSTEM

The invention relates to an information processing system, a sender and receiver device for use in such a system and a method of transmitting information.

From WO 00/05848 an information processing system is known that transmits data and clock information via a first and second signal line that carry a first and second time continuous logic signal respectively. U.S. Pat. No. 5,341,371 also discloses a processing system that transmits data and clock information via two signal lines. In the systems disclosed in both publications, it is ensured that the logic signal on exactly one of the signal lines changes at the start of every new clock phase. Hence, a clock signal can be recovered by taking the "EXCLUSIVE OR" of the two signals as a function of time: the result of the EXCLUSIVE OR changes at the start of each new clock phase. Thus the frequency and number of logic level transitions on the signal lines is minimized, saving power consumption and reducing disturbance.

Data is encoded by selecting which of the two signals changes at the start of a clock phase. The system of U.S. Pat. No. 5,341,371 encodes a series of data bits by changing the logic level of a first one of the signal lines each time the next data bit is not equal to the preceding data bit. The logic level of the second signal line changes when the data bit does not change. This has the effect that the data bit and the first signal always change at the same time. Thus, any disturbing effect of changes in the logic level of the first signal on processing of the data will have an effect that is systematically correlated with changes in the data. The first signal line and a data signal line carry the same signal, potentially generating combined disturbing effects.

The system of WO00/05848 avoids the coincidence of data changes with signal changes on a single one of the signals by changing the logic level of the first signal line when a transmitted data bit has a first logic value and changing the logic level of the second signal line when the transmitted data bit has a second logical value opposite to the first logical value. Variations in the content of the data will distribute the changes over the two signal lines. Thus, it is prevented that the logic level on one of the signal lines always changes when the transmitted data bit changes.

However, the system of WO00/05848 introduces a memory effect: to encode a data bit information about the previous logic level of one of the signal lines is needed. This requires a relatively complex circuit and it has the disadvantage that an error in the information about the previous logic level at one time will have lasting erroneous effect on the signals.

Amongst others, it is an object of the invention to provide for an information processing system in which information is transmitted via a first and second signal line with a logic level transition on exactly one of the signal lines at the start of each new clock phase, and data is encoded by selecting on which signal line the logic level changes, in which system it is avoided that changes in data always lead to changes in logic level on the same signal line, while avoiding that signal errors have a lasting effect.

The system according to the invention is set forth in claim 1. According to the invention at least two different criteria are used alternately to select which one of the signals makes a transition. One of the criteria selects which signal makes a transition as a function of the data level. This prevents a complete correlation between data level changes and changes of the level of one of the signals. Another one of the criteria determines the signal level from the data level. This prevents a lasting memory effect, without creating a complete correlation. In an embodiment, the latter criterion is used only once in every cycle of alternating criteria. Thus, this criterion does not create any systematic correlation between transitions in the data and any one of the signals.

In an embodiment of the system according to the invention a criterion is used for selecting the signal which makes a transition on the basis of a single data bit value for one clock phase. Similarly a criterion is used for selecting the level on the basis of the single data bit value for the clock phase. Alternatively, these criteria might depend for example on intermediate bit values determined from multiple data bits for different clock phases.

In an embodiment, only two different criteria are used, each once in every cycle of alternate criteria, so that one criterion is used for even clock phases and one for odd clock phases.

These and other advantageous aspects of the system, method and stations according to the invention will be described in more detail using the following figures.

Figure 1:
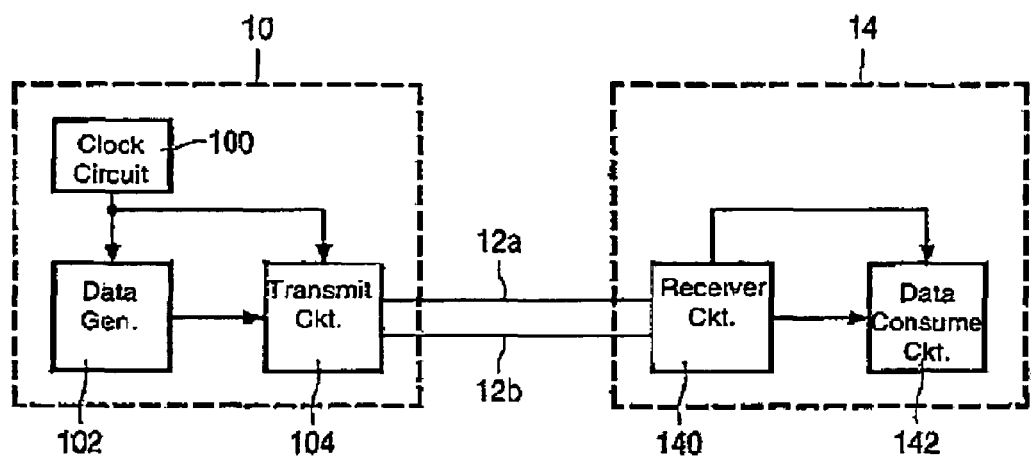
FIG. 1 shows a system with a communication bus.

FIG. 1 shows a system with a communication bus. The system contains a first circuit 10, a communication bus 12*a,b* and a second circuit 14. The first circuit 10 contains a clock circuit 100, a data generating circuit 102 and a transmitter circuit 104. The clock circuit 100 supplies clock signals to the data generating circuit 102 and the transmitter circuit 104. The data generating circuit 102 supplies a data signal to the transmitter circuit 104. The transmitter circuit 104 is connected to two signal lines 12*a,b* of the communication bus 12*a,b*. The second circuit 14 contains a receiver circuit 140 and a data consuming circuit 142. Typically, the first and second circuit 10, 14 are separate Integrated Circuits connected by wiring that forms the bus 12. However, the circuits 10, 14 could also be implemented as different sub-circuits of the same integrated circuit, the bus 12*a,b* containing conductor tracks on the same integrated circuit.

In operation the first circuit 10 produces data, for example video image signal data or a results of computations. The first circuit transmits this data via communication bus 12 to second circuit 14. Second circuit 14 receives the data and processes it, for example in order to display or store video information, or to perform computations on the data. The transmitter circuit 104 receives the data from the data generating circuit 102 and encodes the data and the clock signal into a first and second signal for transmission via a first and second conductor 12*a,b* of the bus 12*a,b* respectively. The receiver circuit 140 receives the two signals from the first and second conductor 12*a,b* and decodes the data and a clock signal from the received signals. The decoded clock signal is used to clock the data consuming circuit 142, which also receives and processes the decoded data.

It is desirable that the signals can be passed along the conductors 12*a,b* at as high a speed as possible. This is made possible by transmitting different data values in successive half periods of the clock, by minimizing the total number of transitions in the signals on the combination of the conductors 12*a,b* and by keeping the part of transmitter circuit 104 and receiver circuit 140 for encoding and decoding of the signals as simple as possible and as robust as possible against errors.

The first and second signal on the first and second conductor 12a,b are encoded so that the clock signal can normally be retrieved by taking the "exclusive or" of the first and second signal. That is, $$C=S1+S2 \text{ or its logic inverse}$$

Here C stands for the clock signal, S1 and S2 stand for the first and second signal and "+" stands for the exclusive or logic operation (0+0=0, 0+1=1, 1+0=1 and 1+1=0). (Throughout in the remainder of description+stands for the "exclusive or" unless explicitly noted otherwise). This relation ensures that exactly one of the signals S1, S2 changes between successive clock phases.

A preferred way of encoding the data signal (represented by "D") according to the invention satisfies the following logic expression:

$$S1=D+C*E(D)$$

$$S2=DN+C*E(DN)$$

Here DN is the inverse of D (DN=1+D) and E( ) stands for a time shift operation that delays a signal by a clock phase: in a half clock period E(D) is the value assumed by D in the previous half clock period and E(C)=C+1. "*" stands for logic multiplication (0*0=0, 0*1=0, 1*0=0 and 1*1=1). "+" stands for the "exclusive or". Since D+DN=1 (D and DN are always logically opposite) and E(D)+E(DN)=E(D+DN)=1, it follows easily from the distributive property of + and * (x*(y+z)=x*y+x*z) that, as required, $$S1+S1=1+C, \text{ which is the inverse of C}$$

D can be decoded from S1 and S2 according to $$D=S1+C*E(D)$$

That is, for C=0 (even clock phases) D=S1. For C=1 (odd clock phases) D=S1+E(D), so that S1 encodes the change of D from the previous clock phase. It will be noted that the dependence of S1 on D is the same as the dependence of S2 on DN. This symmetry in dependence ensures that transitions in the data D don't always coincide with transitions in the same one of the signals S1, S2. It should also be noted that S1 and S2 never depend on the value of D for more than two successive clock phases and that the decoded value of D never depends on more than two successive values of S1 or S2. As a result, there is no lasting memory effect in the decoding or the encoding.

Figure 2:
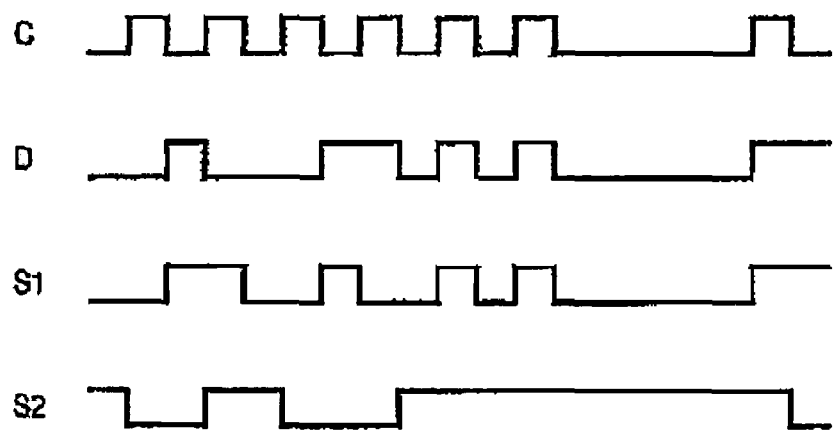
FIG. 2 shows data signals, clock signals and transmission signals

FIG. 2 shows an example of signals obtained by this type of encoding. A first trace of FIG. 2 shows the clock signal C as a function of time, a second trace shows the data D as a function of time and a third and fourth trace show the transmitted signals S1, S2 (transmitted via conductors 12a, b) as a function of time. For synchronization purposes the normal toggling of the clock signal C is periodically interrupted (only one interruption is shown). The interruption allows the data consuming circuit 142 to detect the start of different data words. It will be noted that for C=0 S1(=D) is the inverse of S2 (=DN). For C=1 S1 and S2 depend on the change in D (i.e. on D+E(D)). It will also be noted that different, independent data bits are available.

Of course different kinds of encoding can be realized according to the same principle. For example, the inverse of one or both of the signals S1 or S2 might be used, e.g. S2=D+C*E(ND). In another example the value S1=D+E(D) might be generated not only in each clock phase where C=1 but in n−1 clock phases of a cycle of n clock phases (n being an integer, for example n=4), S1 being equal to D in the remaining clock phase of the cycle of n clock phases. This could be implemented by counting clock phases, using an auxiliary signal A which is computed according to A=C+E (A) (A being set to 0 in some initial clock cycle) and determining S1=D+(1+A*C)*E(D) and S2=ND+(1+A*C) *E(D). In another example, one might convert the combined data values of a plurality of clock phases into intermediate data values and use successive intermediate data values instead of D. This could included error corrective coding. E.g. successive data values 00, 01, 10, 11 could be converted into intermediate data values 00, 11, 01, 10 respectively and encoded.

In principle the signals S1 can be produced from the data D and clock information C using an EXCLUSIVE OR gate and an AND gate to implement the "+" and "*" in the relation S1=D+C*E(D) respectively. S=2 could be determined similarly from S2=DN+C*E(DN) or from its equivalent S2=S1+1+C. However, this would require the supply of successive data bits in half periods of the clock D.

Figure 3:
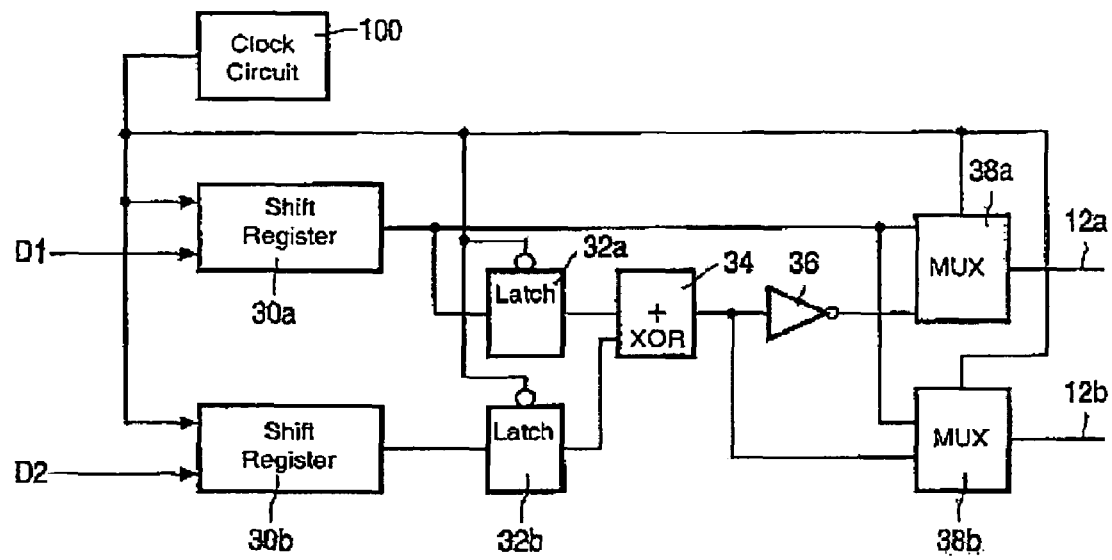
FIG. 3 shows a circuit for encoding data and clock information

FIG. 3 shows a transmitter circuit for encoding the data in which new data only needs to be supplied after once per whole clock period. The circuit contains a first and second shift register 30a,b, latches 32a,b, an exclusive or gate 34, an inverter 36 and a first and second multiplexer 38a,b. The first shift register 30a has an output coupled to a first data inputs of the first and second multiplexer 38a,b and to the first latch 32a. The second shift register 30a has an output coupled to a data input of the second latch 32a. The outputs of the first and second latch 32a,b are coupled to the inputs of an exclusive or gate 34. The output of the exclusive or gate is coupled to a second data input of the first multiplexer 38a via inverter 36 and directly to the second data input of the second multiplexer 38b. The shift registers 30a,b are clocked by the clock signal. This clock signal is supplied to the multiplexers 38a,b as a selection control signal. The latches 32a,b are clocked by the inverse of the clock signal, so as to latch data half a period between the clock transitions at which data is shifted through the shift registers. 30a,b.

In operation, data bits for even clock phases (C=0) are input to the first shift register 30a and data bits for odd clock phases are input to the second shift register 30b. The outputs of the multiplexers 38a,b output the signals S1, S2 to the conductors 12a,b. In the even clock phases the multiplexers 38a,b pass the data from the first shift register 30a to the conductors 12a,b. Halfway through a clock period data from the shift registers is latched into the latches 32a,b. In the odd clock phases the exclusive or of the data in the latches is passed to the second conductor 12b and the inverse of this exclusive or is passed to the first conductor 12a. Thus, the output signals X1, X2 are given by $$X1=D+C*(E(D)+1)$$

$$X2=D+C*(E(D))$$

These are related to the signals S1, S2 defined earlier as follows: X1=1+S2 and X2=S1 and have the same desirable property of symmetric dependence on D and absence of long term memory effects. The latches 32a,b are latched halfway through the clock period to prevent that delays through the exclusive or gate 34 and the inverter 36 cause signal distortion. Of course this is necessary only at very high clock speeds, when the duration of a clock phase approaches the gate delay times of the integrated circuit.

In order to produce the synchronization signals shown in FIG. 2, the clock signal that is applied to the components of FIG. 3 may be disabled periodically.

Of course many other structures can be used to realize the required relation between the output signals X1, X2, the data and the clock.

Figure 4:
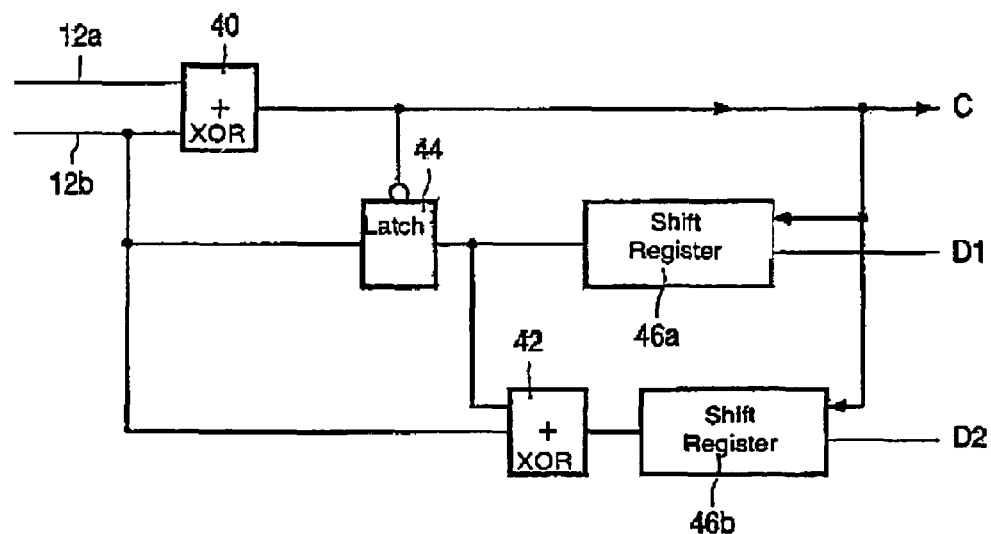
FIG. 4 shows a circuit for decoding data and clock information.

FIG. 4 shows a receiver circuit. This circuit contains a first and second exclusive or gate 40, 42 a latch 44 and a first and second shift register 46a,b. The conductors 12a,b are connected to the inputs of the first exclusive or gate 40. The output of this exclusive or gate forms the clock signal for of the receiver circuit. The latch 44 has a data input coupled to the second conductor 12b and an output coupled to the first shift register 46a and to a first input of the second exclusive or gate 42. The second conductor 12b is coupled to the second input of the second exclusive or gate 44. The output of the second exclusive or gate 44 is coupled to the input of the second shift register 46b. The clock output is coupled to the clock inputs of the registers 46a,b and the latch 44. The shift registers 46a,b latch data at a first polarity of transitions of the clock signal, the latch 44 latches data on a second polarity opposite to the first polarity.

In operation, the circuit of FIG. 4 passes the value of the signal X2 from the second conductor 12b at the start of the even clock phases to the first shift register 46a. The exclusive or of this signal with the value of the signal at the start of the odd clock phases is passed to the second shift register 46b. Thus, the two shift registers 46a,b contain the data values for the even (C=0) and odd (C=1) clock phases respectively. These data values are passed to data consuming circuit 142 (not shown).

Of course, the receiver circuit may be realized in many other ways so as to realize the required decoding relation between the signals X1, X2 and the data and clock information.

The invention claimed is:

1. An information processing system comprising a sender, a receiver and a communication channel coupled between the sender and the receiver, the communication channel being capable of transmitting time-continuously a first binary logic signal and second binary logic signal from the sender to the receiver, the sender being arranged to receive a succession of data values and information distinguishing successive clock phases, the sender being arranged to encode the data values and the information into a combination of the first signal and second signal, the sender using alternately a first and a second data dependent criterion to select which one of the first signal and second signal has a logic level change between immediately successive clock phases, so that the first signal and second signal are alternately mutually opposite and mutually equal, the first criterion selecting the level of the first signal dependent on the data value, the second criterion providing a level change of either the first signal or the second signal dependent on the data value.

2. An information processing system according to claim 1, wherein the first signal and second signal for respective ones of the clock phases alternately depend on the data value for the clock phase according to the first criterion and on a change in the data values between the clock phase and an immediately neighboring clock phase according to the second criterion.

3. An information processing system according to claim 1, wherein the first criterion is used in even clock phases and to second criterion is used in odd clock phases.

4. A sender circuit with a data producing circuit, a clock circuit, an encoder and a connection for a communication channel, the data producing circuit being arranged to produce a succession of data values, the clock circuit being arranged to generate information distinguishing successive clock phases, encoder being arranged to encode the data values and the information into a combination of a first binary logic signal and second binary logic signal for time continuous transmission via the communication channel, the encoder using alternately a first and a second data dependent criterion to select which one of the first signal and second signal has a logic level change between immediately successive clock phases, so that the first signal and second signal are alternately mutually opposite and mutually equal, the first criterion selecting the level of the first signal dependent on the data value, the second criterion providing a level change of either the first signal or the second signal dependent on the data value.

5. A receiver circuit with a connection for a communication channel the receiver comprising an decoder and a data consuming circuit and connections for a communication channel, the decoder being arranged to recover a clock signal for data consuming circuit, the clock signal having a level change each time at least one of a first and second, time continuous binary logic signal on the connections undergoes a binary level change, the encoder being is arranged to decode data values or successive clock phases of the clock signal using alternately a first and a second signal dependent criterion, the first criterion providing mutually opposite data values dependent on the level of the first signal, the second criterion providing mutually opposite data values dependent on whether the first signal or the second signal changes level between the clock phases.

6. Method of transmitting data and clock information in the form of a first and second time-continuous electric binary logic signals, wherein alternately a first and a second data dependent criterion is used to select which one of the first and second signal has a logic level change between immediately successive clock phases, so that the first signal and second signal are alternately mutually opposite and mutually equal, the first criterion selecting the level of the first signal dependent on a data value, the second criterion providing a level change of either the first or the second signal dependent on the data value.

* * * * *